N. FARLOW & J. A. HAM.
HAY RAKER AND LOADER.
No. 95,451.                Patented Oct. 5, 1869.
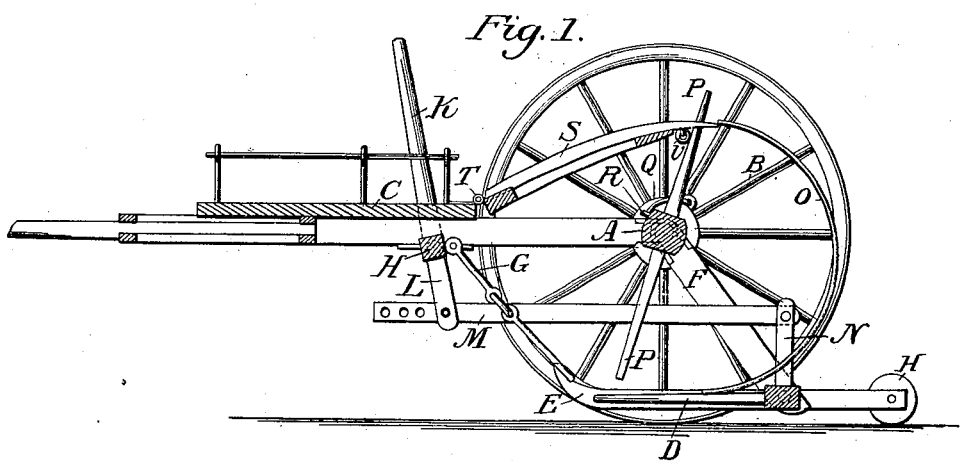
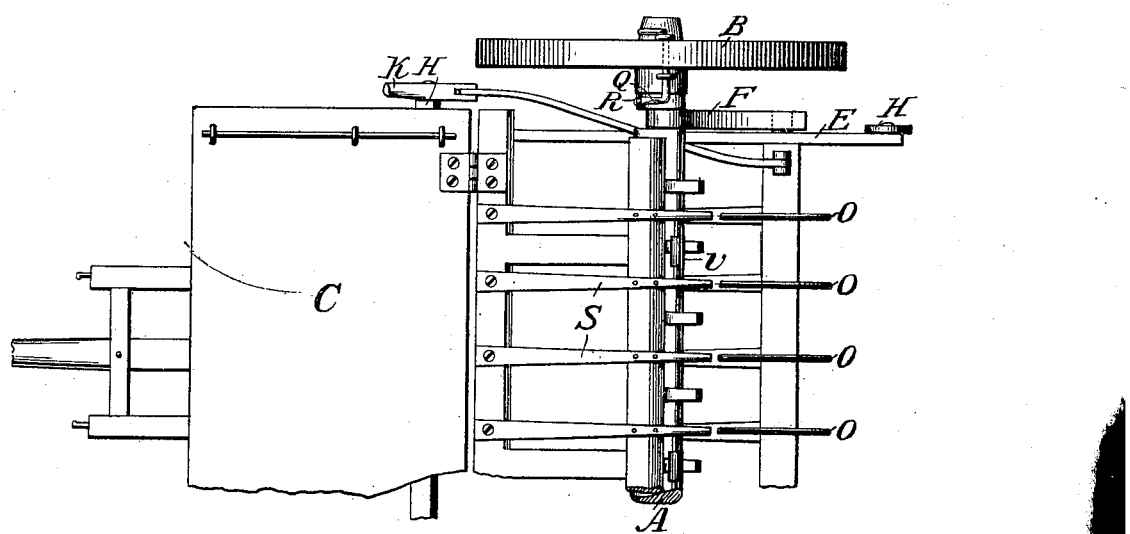
Witnesses.
O. Hinchman
Jno. K. Brook
Inventors.
N. Farlow, J. A. Ham
per _____
Attorneys.

United States Patent Office.

NEWTON FARLOW AND JOHN A. HAM, OF SULLIVAN, ILLINOIS.

Letters Patent No. 95,451, dated October 5, 1869.

IMPROVEMENT IN HAY-RAKERS AND LOADERS.

The Schedule referred to in these Letters Patent and making part of the same.

*To all whom it may concern:*

Be it known that we, NEWTON FARLOW and JOHN A. HAM, of Sullivan, in the county of Moultrie, and State of Illinois, have invented a new and improved Hay-Rake and Loader; and we do hereby declare that the following is a full, clear, and exact description thereof, which will enable others skilled in the art to make and use the same, reference being had to the accompanying drawing, forming part of this specification.

This invention relates to improvements in apparatus for raking hay and elevating it to a pitching-platform, all suspended from a pair of wheels to be hitched to and drawn by the wagon to be loaded, or when used for gathering grain for binding, to be drawn by a horse.

The invention consists in certain arrangements of the parts, as hereinafter specified.

Figure 1 represents a longitudinal sectional elevation, and

Figure 2 represents a plan view of a machine, constructed according to our arrangement.

Similar letters of reference indicate corresponding parts.

A represents an axle; B, a pair of wheels; and C, a platform, constituting the supporting-parts of the apparatus; the beams of the platform being connected to the axle.

D represents a gathering-rake, the head of which is supported by journals at each end in runners E, suspended by hangers F from the axle and chains or rods G, from a transverse shaft, I, having bearings under the beams of the platform.

The rear ends of the runners are provided with wheels H.

On one end of the shaft I is a hand-lever, K, projecting below the same at L, and adjustably connected to a connecting-rod, M, running back to and connecting with an arm rising from the rake-head D.

The rake-head D is free to turn in the runners, and by means of the lever K, both the runners and the teeth of the head A, which gather the hay from the ground, may be adjusted relatively from the ground, or may be so elevated as to be moved from place to place freely, bearing on the ground only by the wheels H.

The teeth of the gathering-rake are provided with bent wire guides O, representing semicircular curves, around the axle A, or nearly so, and rising considerably above the axle.

The latter is armed with two sets of straight teeth, P, intended to gather the hay from the lower rake and deliver it to the top of the platform. They are caused to move a half turn at each revolution of the wheels by the gravitating-dogs $Q_1$ pivoted to the hubs of the wheels engaging the studs R in the end of the axle, each time they arrive at the upper side, and escaping therefrom at the under side of the hubs.

S represents a discharger, composed of a number of bent teeth properly connected together, hinged to the frame at T, and so arranged, that as the teeth P are gathering the hay from the lower rake and the guards O, their points will rest on the axle, projecting slightly beyond it, and between the fingers P, when they rise.

To cause the fingers S to rise toward and over the points of the fingers D, yielding rollers U are placed on them, so as to be struck by two or more of the fingers P, and ride over them, as shown in fig. 1.

In this way the hay, straw, or other substance will be delivered to the top of the said discharger, from whence it may be pitched to the wagon, or, in the case of the grain, may be taken up for binding, and then disposed of as required.

Having thus described our invention,

What we claim as new, and desire to secure by Letters Patent, is—

1. The combination of the gathering-rake D, guards O, revolving rakes P, and discharger S, when all arranged substantially as specified.

2. The arrangement of the rake D, runners E, rollers H, arm N, connecting-rod M, lever K, and chains G, all substantially as specified.

3. The discharging-teeth S, hinged to the platform, and provided with the yielding rollers U, and combined with the fingers P, substantially as specified.

4. The gravitating-dogs Q, pivoted to the wheels, and arranged for action upon the studs R in the axle, substantially as specified.

NEWTON FARLOW.
JOHN A. HAM.

Witnesses:
ALFRED N. SMYSER,
JACOB N. SAYER.